H. O. NEEBE.
ROTARY INTERNAL COMBUSTION ENGINE.
APPLICATION FILED APR. 13, 1917. RENEWED JULY 28, 1920.

1,370,548.

Patented Mar. 8, 1921.
3 SHEETS—SHEET 1.

WITNESSES
H. T. Walker

INVENTOR
Henry O. Neebe
BY
ATTORNEYS

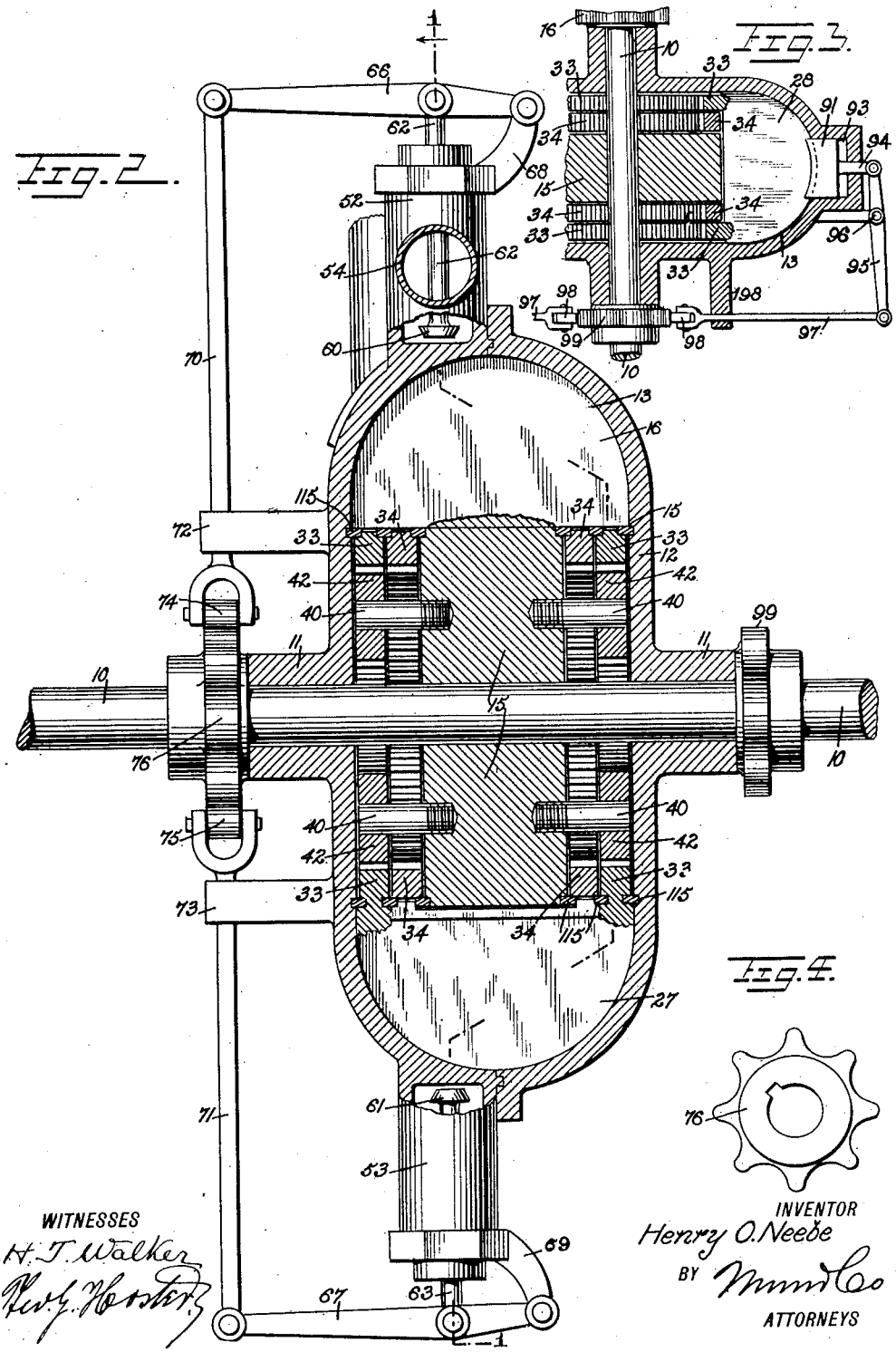

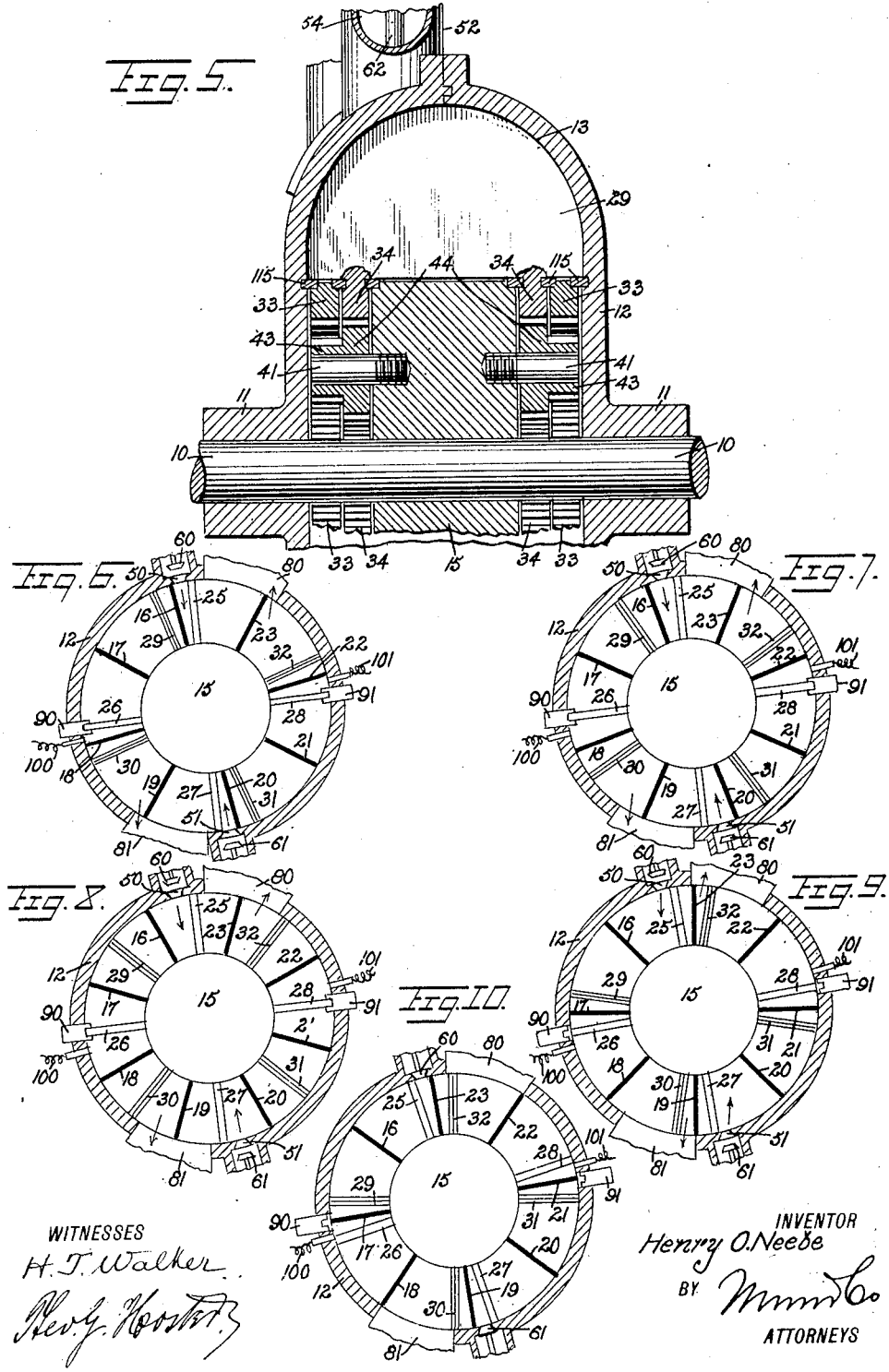

UNITED STATES PATENT OFFICE.

HENRY OSCAR NEEBE, OF NEW YORK, N. Y.

ROTARY INTERNAL-COMBUSTION ENGINE.

1,370,548.          Specification of Letters Patent.          Patented Mar. 8, 1921.

Application filed April 13, 1917, Serial No. 161,750. Renewed July 28, 1920. Serial No. 399,625.

*To all whom it may concern:*

Be it known that I, HENRY O. NEEBE, a citizen of the United States, and a resident of the city of New York, borough of Manhattan, in the county and State of New York, have invented a new and Improved Rotary Internal-Combustion Engine, of which the following is a full, clear, and exact description.

The object of the invention is to provide a new and improved rotary internal combustion engine arranged to subject the rotor to a plurality of impulses at each revolution of the rotor, thus rendering the engine exceedingly powerful without requiring an undue increase in the dimensions of the engine.

In order to accomplish the desired result, use is made of a cylinder having a valved inlet for the motive agent and having an exhaust for the products of combustion, a rotor in the said cylinder and having rotor heads, abutment and compression members in the said cylinder and alternating with the said rotor heads, locking devices for alternately locking successive abutments and compression members temporarily against movement, means rotating the unlocked abutment and compression members from the rotor at a speed in excess of that of the rotor heads, and an ignition device for igniting a compressed charge between the rotor head and an abutment and compression member.

A practical embodiment of the invention is represented in the accompanying drawings forming a part of this specification, in which similar characters of reference indicate corresponding parts in all the views.

Fig. 2 is a sectional side elevation of the same on the line 2—2 of Fig. 1;

Fig. 3 is a reduced sectional plan view of a portion of the same and showing more particularly one of the locking mechanisms for the abutment and compression members;

Fig. 4 is a face view of the valve actuating cam wheel;

Fig. 5 is a cross section of the rotary engine on the line 5—5 of Fig. 1; and

Figs. 6, 7, 8, 9 and 10 are diagrammatic views showing the several parts in the various positions during one-eighth revolution of the engine rotor.

Figure 1:
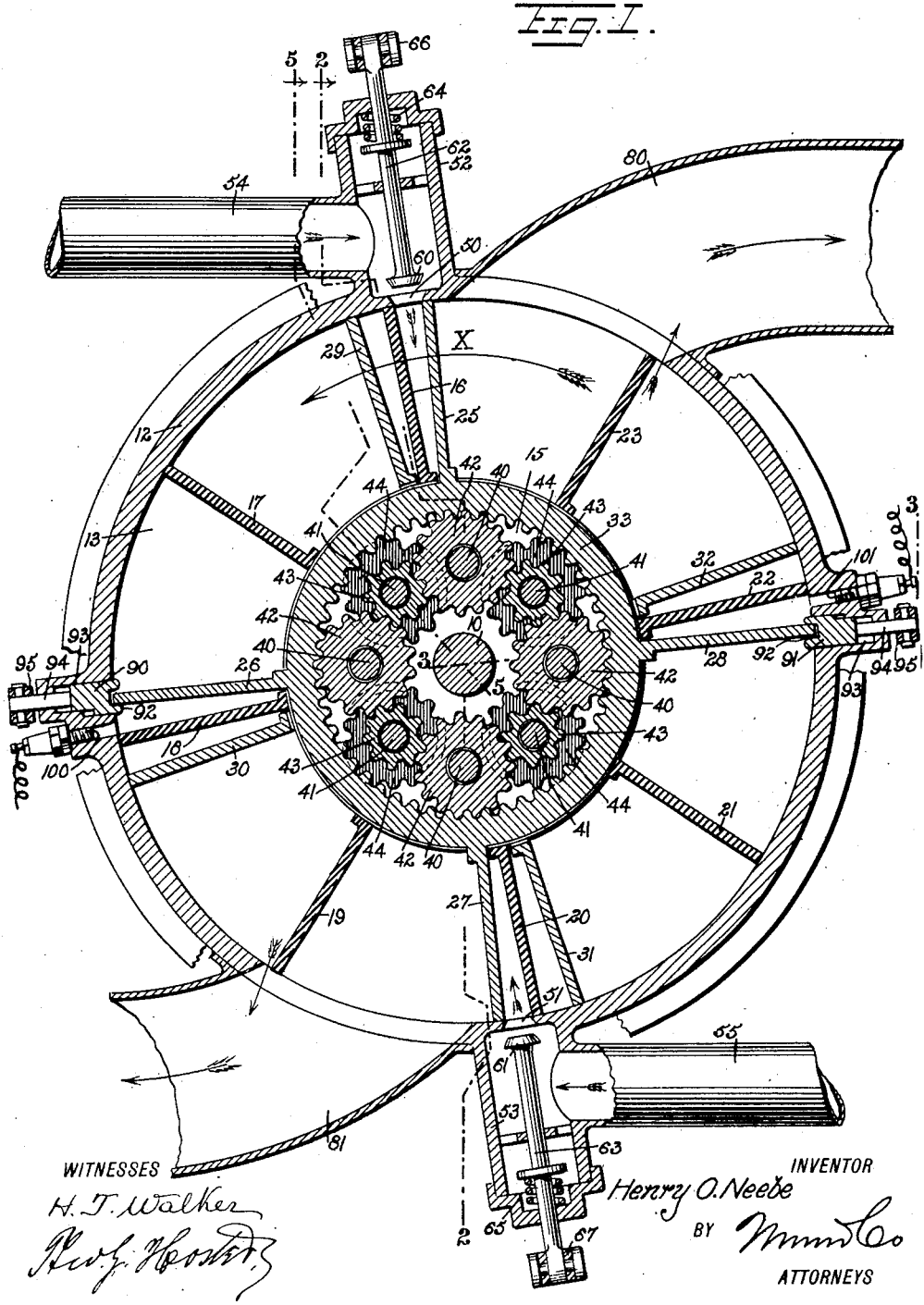
Figure 1 is a cross section of the rotary internal combustion engine, the section being on the line 1—1 of Fig. 2.

The engine shaft 10 is journaled in suitable bearings 11 attached to or forming part of the heads of the cylinder 12, and the latter is provided with an annular working chamber 13, preferably made semicircular in cross section, as plainly indicated in Figs. 2, 3 and 5. On the shaft 10 within the cylinder 12 is secured a rotor 15 provided with radially disposed heads 16, 17, 18, 19, 20, 21, 22 and 23, spaced equal distances apart and fitting the working chamber 13. In the working chamber 13 are arranged two sets of radially disposed abutment and compression members 25, 26, 27, 28, and 29, 30, 31, 32. The abutment and compression members 25, 26, 27 and 28 extend integrally and radially from the peripheral faces of internal gear wheels 33 extending within the cylinder adjacent the inner faces of the cylinder heads, as plainly indicated in Figs. 2, 3 and 5. The abutment and compression members 25, 26, 27 and 28 are spaced equal distances apart. The abutment and compression members 29, 30, 31 and 32 extend integrally from the peripheral faces of two internal gear wheels 34, arranged within the cylinder 12 and disposed intermediate the internal gear wheels 33 and the faces of the rotor 15. The abutment and compression members 29, 30, 31 and 32 are spaced equal distances apart, and by reference to Fig. 1 it will be noticed that the rotor head 16 is intermediate the abutment and compression members 25, 29, the rotor head 17 is intermediate the abutment and compression members 29, 26, the rotor head 18 is intermediate the abutment and compression members 26, 30, the rotor head 19 is intermediate the abutment and compression members 30 and 27, the rotor head 20 is intermediate the abutment and compression members 27, 31, the rotor head 21 is intermediate the abutment and compression members 31, 28, the rotor head 22 is intermediate the abutment and compression members 28, 32, and the rotor head 23 is intermediate the abutment and compression members 32 and 25.

The internal gear wheels 33 and 34 are connected with each other and with the rotor 15, and for this purpose the following arrangement is made: On the faces of the rotor 15 are arranged studs 40 and 41, of which the studs 40 are provided with pinions 42 in mesh with the internal gear wheels 33. The pinions 42 are in mesh with pinions 43 mounted to rotate loosely on the studs 41 and attached to pinions 44 in mesh with the internal gear wheels 34. When two diametrically opposite abutment and compression members 26, 28 or 25, 27 are held against rotation while the rotor 15 is rotating, then the corresponding pinions 42 carried along by their studs 40 are turned by being in mesh with the now stationary internal gear wheels 33, and the rotary motion of the pinions 42 is transmitted to the pinions 43, 44 whereby the other internal gear wheels 34 are turned at a higher rate of speed than the rotor 15. In a like manner when two diametrically opposite abutment and compression members 29, 31 and 30, 32 are held against rotation while the rotor 15 is turning, then the corresponding pinions 44 are rotated and by the pinions 43 and 42 rotate the internal gear wheels 33 at an increased speed relative to that of the rotor 15. Thus when any one of the abutment and compression members 25, 26, 27 or 28 is held against rotation the other abutment members 29, 30, 31 and 32 move forward at an accelerated rate of speed relative to the rotor 15; and when any one of the abutment and compression members 29, 30, 31 or 32 is held against rotation then the other abutment and compression members 25, 26, 27 and 28 rotate at an accelerated rate of speed relative to the rotor 15.

The cylinder 12 is provided at diametrically opposite points with inlet ports 50 and 51 for the passage of the explosive mixture into the working chamber 13 of the cylinder 12. The ports 50 and 51 open into chambers 52, 53 connected by pipes 54, 55 with a carbureter or other suitable source of explosive mixture supply. The ports 50 and 51 are controlled by valves 60 and 61 having their stems 62 and 63 mounted to slide in suitable bearings in the chambers 52 and 53 and pressed on by springs 64 and 65 so as to normally move the valves 60 and 61 into closed position relative to the ports 50 and 51. The outer ends of the valve stems 62 and 63 are connected with levers 66, 67 fulcrumed on brackets 68 and 69 attached to or forming part of the chambers 52 and 53. The levers 66, 67 are pivotally connected with links 70, 71 engaging bearings 72 and 73 attached to the cylinder 12, and the said links 70 and 71 are provided with friction rollers 74, 75 in contact with the peripheral face of a cam 76 secured on the engine shaft 10. The cam 76 is arranged to open the valves 60 and 61 once during every one-eighth of a revolution of the shaft 15 to admit charges of the explosive mixture into the working chamber 13 of the cylinder 12 at diametrically opposite points, that is, by way of the ports 50 and 51. In the rear of the port 50 is arranged a pipe 80 and a similar pipe 81 is arranged in front of the port 51, the said exhaust pipes 80 and 81 serving to carry off the products of combustion, as hereinafter more fully explained.

As previously mentioned, the abutment and compression members are held periodically against movement and for this purpose locking devices 90 and 91 are provided and mounted to slide in the wall of the working chamber 13 located diametrically opposite each other and at right angle positions relative to the ports 50 and 51. The locking devices 90 and 91 are alike in construction and each is provided with a groove 92 adapted to be engaged by the outer end of the corresponding abutment and compression member 25, 26, 27, 28, 29, 30, 31 or 32, and each locking member is mounted to slide radially in a suitable bearing 93 formed in the peripheral wall of the working chamber 13. Each locking member 90 is provided with an outwardly extending stem 94 pivotally connected at its outer end with a lever 95 fulcrumed at 96 on the outside of the working chamber 13. The lever 95 is connected with a link 97 mounted to slide in a suitable bearing 98 attached to the cylinder 12 (see Fig. 3). On the inner end of each link 97 is journaled a friction roller 98 in engagement with the peripheral face of a cam 99 secured on the shaft 10 and similar to the cam 76 previously mentioned. Normally the locking devices 90 and 91 are in innermost position to diametrically hold the corresponding abutment and compression member against movement and at every eighth revolution of the shaft 10 the locking members 90, 91 are drawn outwardly by the action of the cam 99 and the connections described to unlock the corresponding abutment and compression members and to allow the same to travel forward. When the next following abutment and compression members move into register with the locking devices 90 and 91 then the latter move inward to engage such abutment and compression members to hold the same for the time being against movement. Immediately in front of the locking devices 90 and 91 are arranged ignition devices 100 and 101 connected with the interior of the working chamber 13 to ignite the compressed charges therein immediately in the front of the corresponding abutment and compression member held against movement at the time by the locking devices 90 and 91.

The operation is as follows:

When the engine is running the rotor 15 and its heads 16, 17, 18, 19, 20, 21, 22 and 23 travel continually in the direction of the arrow $x$ shown in Fig. 1. It will be noticed that when the several parts are in the position illustrated in Fig. 1 then the compressed charges in the spaces between the locked abutment and compression members 26 and 28 and the corresponding rotor heads 18 and 22 are ignited by the igniting devices 100 and 101 so that a double impulse is given to the rotor at diametrically opposite points to continue the rotation of the rotor in the direction of the arrow $x$. During the time that the charges are ignited as described, the fresh charges are passed from the chambers 52, 53 by way of the open valves 60, 61 and the ports 50, 51 into the spaces between the abutment and compression members 25, 27 and the corresponding rotor heads 16 and 20, but as the internal gear wheels 33 and their abutment and compression members 25, 26, 27 and 28 are locked against movement, it is evident that the rotor heads 16 and 20 move forwardly away from the now stationary abutment and compression members 25 and 27 to draw in the charges from the chambers 52 and 53. When nearly one-eighth of a revolution has been made the valves 60 and 61 close (see Fig. 10). The products of combustion of previous explosions and contained in the spaces between the rotor heads 19, 23 and the abutment and compression members 30, 32 begin to pass out through the exhaust pipes 81 and 80. While the rotor is advancing from the position shown in Figs. 1 and 6, the abutment and compression members 29, 30, 31 and 32 are likewise advancing during the next one-eighth of a revolution but at a higher rate of speed than the rotor heads, as will be readily understood by reference to Figs. 7, 8, 9 and 10, whereby the charges previously admitted between the heads 17, 21 and the abutment and compression members 29 and 31 are compressed while the products of combustion contained in the spaces between the rotor heads 19, 23 and the abutment and compression members 30 and 32 are completely exhausted into the exhaust pipes 81 and 80. When the rotor has made nearly one-eighth of a revolution the valves 60 and 61 move into closed position and the locking devices move outwardly into open position, as previously mentioned and shown in Fig. 10, and when the rotor has finally completed one-eighth of a revolution then the rotor heads 17 and 21 have passed just beyond the ignition devices 100 and 101 and now occupy the positions previously occupied by the rotor heads 18 and 22. The valves 60 and 61 remain closed until the rotor heads 23 and 19 have passed the ports 50 and 51 and occupy the positions previously had by the rotor heads 16 and 20, as shown in Fig. 6. The abutment and compression members 29 and 31 are now engaged by the locking devices 90 and 91 and are thus held against rotation together with the abutment and compression members 30 and 32 now in the rear of the ports 51 and 50. The valves 60 and 61 now open to allow new charges to pass into the receiving chambers formed between the heads 23, 19 and the members 32 and 30. The internal gear wheels 34 being held against movement cause the other internal gear wheels 33 to turn at an accelerated speed. The above described operation is repeated for every one-eighth revolution of the rotor 15 with a corresponding change in the positions of the rotor heads and the abutment and compression members, of which one set is held against movement and forms abutments and the other set is moved forward at an accelerated rate of speed and forms compression members to cause proper compression of the charges and complete exhaust of the products of combustion.

From the foregoing it will be seen that by the arrangement described sixteen impulses are given to the rotor at each revolution thereof, and at the same time a complete discharge of the products of combustion of previous explosions is had.

It is understood that a charge receiving chamber is formed between a rotor head and its following abutment and compression member at the corresponding port 50 or 51, and an ignition chamber is formed at the ignition device 100 or 101 between the corresponding rotor head and the following abutment and compression member. By having an abutment and compression member following an advancing rotor head at an accelerated rate of speed the charge between the two is compressed to the desired degree to be next ignited by the igniting device 100 or 101, and at the time the movable compression member has become the fixed abutment member.

Although I prefer the arrangement described. it is evident that I do not limit myself to the number of rotor heads and abutment and compression members mentioned, as the same may be increased or diminished according to the size and use of the engine to be built, but in each case use is made of, at least, two rotor heads and corresponding sets of abutment and compression members held alternately against movement during the suction period with the unlocked compression members advancing at an accelerated rate of speed. It will be noticed that empty spaces are had in the rear of the abutment and compression members 25, 29, 26, 30, 27, 31, 28 and 32.

As shown in Figs. 2 and 6, suitable packing rings 115 are used at the rotor 15, the internal gear wheels 34, 33, the inner faces of the cylinder 12, the rotor heads and the abutment and compression members to prevent leakage of the charges and the products of combustion.

Having thus described my invention, I claim as new and desire to secure by Letters Patent:—

1. A rotary internal combustion engine, comprising a cylinder, a rotor therein and having a plurality of rotor heads, sets of abutment and compression members, the members of the sets being on opposite sides of sundry of the rotor heads, one of the said members forming a temporary stationary abutment for the rotor head in front of it and the next member intermediate adjacent rotor heads forming a compression member for the rotor head in advance of it and moving at an accelerated speed.

2. A rotary internal combustion engine provided with a cylinder, a rotor therein and having a plurality of rotor heads spaced equal distances apart, sets of abutment and compression members, the members of the sets being on opposite sides of sundry of the rotor heads and of which the first and third are held temporarily against movement and to form with the corresponding rotor heads a charge receiving chamber and an ignition chamber, the second of the said members moving at an accelerated speed toward its rotor head to compress a previously drawn in charge.

3. A rotary internal combustion engine provided with a cylinder, a rotor therein and having a plurality of rotor heads spaced equal distances apart, abutment and compression members alternating with the said rotor heads and of which the first and third are held temporarily against movement and to form with the corresponding rotor heads a charge receiving chamber and an ignition chamber, the second of the said members moving at an accelerated speed toward its rotor head to compress a previously drawn in charge, a valved supply chamber connected with the said receiving chamber, and an igniting device connected with the said ignition chamber.

4. A rotary internal combustion engine comprising a cylinder, a rotor in the cylinder and having a plurality of heads, sets of abutment and compression members, the members of the sets being on opposite sides of sundry of the rotor heads, means for alternately locking said members, and means whereby when one of the members is locked the other will be turned at a greater rate of speed than the rotor.

5. A rotary internal combustion engine, comprising a cylinder having a valved inlet for the motive agent and having an exhaust for the products of combustion, a rotor in the said cylinder and having a plurality of heads, sets of abutment and compression members in the said cylinder, the members of the sets being on opposite sides of sundry of the rotor heads, locking devices for alternately locking successive abutment and compression members temporarily against movement, means rotating the unlocked abutment and compression members from the rotor at a speed in excess of that of the rotor heads, and an ignition device for igniting a compressed charge between a rotor head and an abutment and compression member.

6. A rotary internal combustion engine, comprising a cylinder having valved inlets and exhausts, a rotor in the said cylinder and having a plurality of heads fitting the cylinder and spaced equal distances apart, sets of abutment and compression members fitting the cylinder and attached to internal gear wheels, and pinions carried by the said rotor and connecting the said internal gear wheels with each other.

7. A rotary internal combustion engine, comprising a cylinder having valved inlets and exhausts, a rotor in the said cylinder and having a plurality of heads fitting the cylinder and spaced equal distances apart, sets of abutment and compression members fitting the cylinder, the members of the sets being on opposite sides of sundry of the rotor heads, locking devices for alternately locking and unlocking the said sets of abutment and compression members, ignition devices adjacent the said locking devices, and a gearing connecting the sets of abutment and compression members with each other and with the rotor, whereby when one of the said members is locked the other will be turned at a greater rate of speed than the rotor.

8. A rotary internal combustion engine, comprising a cylinder having valved inlets and exhausts, a rotor in the said cylinder and having a plurality of heads fitting the cylinder and spaced equal distances apart, sets of abutment and compression members fitting the cylinder and attached to internal gear wheels, pinions carried by the said rotor and connecting the said internal gear wheels with each other, locking devices controlled from the rotor for alternately locking and unlocking the said sets of abutment and compression members, and ignition devices adjacent the said locking devices.

9. A rotary internal combustion engine, comprising a cylinder having valved inlets and exhausts, a rotor in the said cylinder and having a plurality of heads fitting the cylinder and spaced equal distances apart, sets of abutment and compression members fitting the cylinder and arranged alternately and with a rotor head intermediate adjacent abutment and compression members, locking devices for locking and unlocking the said sets of abutment and compression members, ignition devices adjacent the said locking devices, and means connecting the said sets of abutment and compression members with each other and with the rotor.

10. In an internal combustion engine, a cylinder, a rotor in the clyinder and having heads, sets of members on opposite sides of sundry of the rotor heads, slidable locking devices for engaging the outer ends of the said members, means for operating the locking devices, gearing for connecting the said members with each other and with the rotor whereby when one member is locked the other will turn at a greater rate of speed greater than the rotor.

11. In an internal combustion engine, a cylinder, a rotor in the cylinder and having heads, internal gear wheels on opposite sides of the rotor and having members extending on opposite sides of sundry of the heads of the rotor, pinions on the rotor and meshing with the internal gear wheels, and loose pinions between the pinions of the rotor.

HENRY OSCAR NEEBE.